No. 839,986. PATENTED JAN. 1, 1907.
E. E. BULLOCK.
BOULEVARD AND SPEED WAGON.
APPLICATION FILED AUG. 21, 1905.
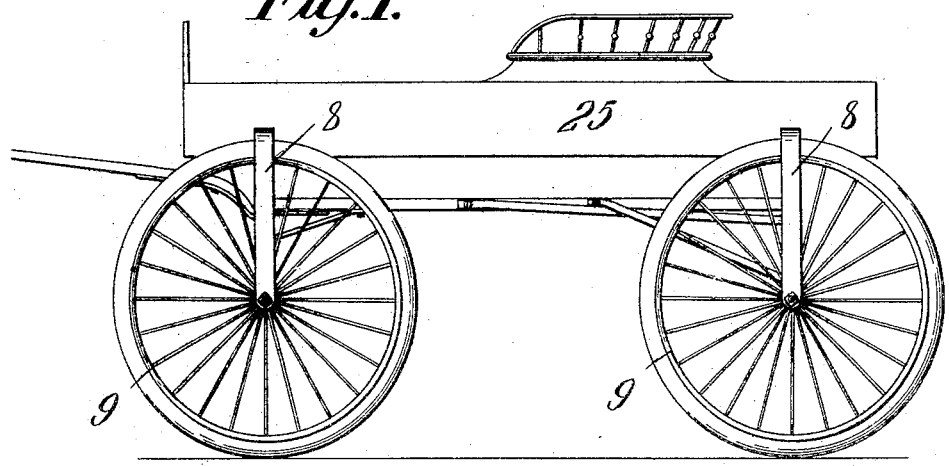
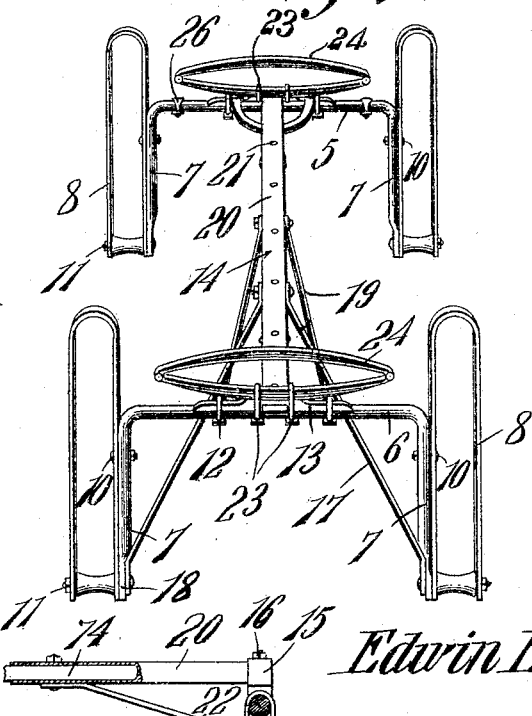
Edwin E. Bullock,
INVENTOR.
WITNESSES:
By
ATTORNEYS

UNITED STATES PATENT OFFICE.

EDWIN E. BULLOCK, OF LISBON, NORTH DAKOTA.

BOULEVARD AND SPEED WAGON.

No. 839,986.   Specification of Letters Patent.   Patented Jan. 1, 1907.

Application filed August 21, 1905. Serial No. 275,139.

*To all whom it may concern:*

Be it known that I, EDWIN E. BULLOCK, a citizen of the United States, residing at Lisbon, in the county of Ransom and State of North Dakota, have invented a new and useful Boulevard and Speed Wagon, of which the following is a specification.

This invention relates to speed-wagons, and has for its object to provide a strong, durable, and comparatively inexpensive device of this character in which the supporting-frame is reinforced and strengthened by the provision of lateral reinforcing-braces which connect the reach with the rear axle and forks, respectively, and serve to receive the strains incident to traveling over rough uneven roads.

A further object of the invention is to provide a speed-wagon in which the body of the wagon is supported below the top plane of the wheels and is yieldably held in position on the running-gear by springs disposed on the front and rear axles.

A further object is to provide an axle having its opposite ends bent downwardly to form depending arms for engagement with the wheel forks or guards said forks being detachably secured to the arms and extended vertically above the axle.

A further object of the invention is to generally improve this class of devices so as to increase their utility, durability, and efficiency.

With these and other objects in view the invention consists in the construction and novel combination and arrangement of parts hereinafter fully described, and illustrated in the accompanying drawings, it being understood that various changes in form, proportions, and minor details of construction may be resorted to within the scope of the appended claims.

In the accompanying drawings, forming a part of this specification, Figure 1 is a side elevation of a speed-wagon constructed in accordance with my invention. Fig. 2 is a perspective view of the running-gear with the wagon-body and wheels removed. Fig. 3 is a side elevation, partly in section, of the front end of the reach.

Similar numerals of reference indicate corresponding parts in all the figures of the drawings.

The vehicle consists of the front and rear axles 5 and 6, each preferably formed of a single bar of iron or tubing having its opposite ends bent downwardly to form depending arms 7, to which are detachably secured substantially U-shaped forks 8, forming guards for the wheels 9. The curved or closed ends of the guards 8 extend vertically above the axles 5 and 6 and are detachably secured to the arms 7 by means of bolts or similar fastening devices 10 and 11, the bolt 11 forming the spindle for the wheels 9, as shown. Secured to the axles by suitable clips 12 are bolsters 13, and mortised in the bolster of the rear axle 6 is one end of a reach-bar 14, the opposite end of which is secured to a head-block 15 on the front bolster, as by a king-bolt 16. Secured to and extending from the reach 14 are diagonal braces 17, the opposite ends of which bear against the flattened ends 18 of the rear axle-arms 7, said braces being secured to the arms by the bolts 11. It will thus be seen that the bolts 11 serve to secure the rear forks and braces 17 to the depending arms of the rear axle 6 and also form stub axles or spindles for the wheels 9.

Secured to the reach 14 in advance of the adjacent ends of the braces 17 are auxiliary braces 19, the opposite ends of which are secured to the rear axle 6 on each side of the reach, thereby to assist in reinforcing and strengthening the supporting-frame and receiving the strains incident to riding over rough and uneven roads. The reach 14 is preferably reinforced by an inclosed casing 20, formed of metal and secured to the reach in any suitable manner, as by bolts or rivets 21, there being a brace 22 secured to the reach and extending beneath the front axle 5 to prevent backward movement of said axle.

Secured to the bolster 13 and head-block 15, as by clips 23, are transverse elliptical springs 24, which serve to yieldably support the wagon-body 25 on the running-gear, it being here noted that the bed of the wagon-body is supported below the top plane of the wheels 9 and is centered with respect to the front and rear axles, thereby to insure a strong, compact, and light-running vehicle.

Secured to the front axle 5 on each side of the head-block 15 are thill-couplings 26, to which are attached thills of any approved construction.

Attention is called to the fact that the braces 17 serve to space the depending arms of the rear axle apart and also serve to prevent torsional movement of said arms, while the braces 19 assist in reinforcing the running-gear and alining the reach-bar.

The wheels may be made in different sizes and shapes and, if desired, the spring may be dispensed with and the wagon-body supported directly on the bolsters.

From the foregoing description it will be seen that there is provided an extremely simple, inexpensive, and efficient vehicle, admirably adapted for the attainment of the ends in view.

Having thus described the invention, what is claimed is—

1. In a vehicle, front and rear axles having their opposite ends bent downwardly to form depending arms, a reach connecting the axles, forks detachably secured to the arms and forming guards for the vehicle-wheels, lateral braces connecting the arms of the rear axles and reach, respectively, and bolts connecting the arms and adjacent forks, one of the connecting-bolts of each rear fork being passed through the brace and extended laterally to form the spindle of the adjacent vehicle-wheel.

2. In a vehicle, front and rear axles each formed from a single piece of metal the opposite ends of which are bent downwardly to form depending arms, a reach connecting said axles, forks detachably secured to the arms and extending vertically above the axles, lateral braces connecting the arms of the rear axles and reach, respectively, and bolts connecting the forks to the arms, one of the connecting-bolts of each rear fork being passed through the brace and extended laterally to form the spindle of the adjacent vehicle-wheel.

3. In a vehicle, front and rear axles having their opposite ends bent downwardly to form depending arms, a reach connecting said axles, forks detachably secured to the arms and extending vertically above the axles to form guards for the vehicle-wheels, springs mounted on the axles, a wagon-body yieldably supported on the springs and having its bed arranged below the top plane of the vehicle-wheels, lateral braces connecting the arms of the rear axles and reach, respectively, and auxiliary braces extending between the reach and rear axles and intersecting the lateral braces.

4. In a vehicle, front and rear axles having their opposite ends bent downwardly to form depending arms, a reach connecting said axles, forks detachably secured to the arms and extended vertically above the axles to form guards for the vehicle-wheels, lateral braces connecting the free ends of the rear arms and the reach, and auxiliary braces connecting the rear axle and reach respectively, and intersecting the lateral braces.

5. In a vehicle, front and rear axles having their opposite ends bent downwardly to form depending arms, a reach connecting said axles, substantially U-shaped forks detachably secured to the arms and having their closed ends extended vertically above the axles, lateral braces connecting the free ends of the rear arms and the reach, respectively, bolts piercing the forks and arms, one of said connecting-bolts being threaded through the end of the adjacent brace and extended laterally across the open end of the fork to form a spindle for the adjacent vehicle-wheel.

6. In a vehicle, front and rear axles having their opposite ends bent downwardly to form depending arms, a reach connecting said axles, substantially U-shaped forks extending vertically above the axles and each having one leg thereof arranged parallel with the adjacent arm and detachably secured thereto, braces extending between the free ends of the rear arms and the intermediate portion of the reach, bolts connecting the forks with the arms, one of the connecting-bolts of the rear forks being secured to the end of the adjacent brace and extended laterally across the open end of the fork to form a spindle for the adjacent vehicle-wheel, and auxiliary braces secured to the rear axle and having their opposite ends fastened to the reach in advance of the lateral braces, said reach being inclosed in a metallic casing.

7. In a vehicle, front and rear axles having their opposite ends bent downwardly to form depending arms, a reach connecting said axles, substantially U-shaped forks detachably secured to the arms and having their closed ends extended vertically above the axles, lateral braces connecting the free ends of the rear arms and reach, respectively, bolts piercing the forks and arms, one of the connecting-bolts of each rear arm being threaded through the end of the brace and extended laterally across the open end of the adjacent fork to form a spindle for the wheel, auxiliary braces secured to the reach and connected with the rear axle, and a brace connecting the reach and front axle.

EDWIN E. BULLOCK.

Witnesses:
ANDREW SANDAGER,
HARLEY S. GROVER.